United States Patent
Kass et al.

(10) Patent No.: US 11,354,044 B2
(45) Date of Patent: *Jun. 7, 2022

(54) IDENTIFYING AN AVAILABILITY OF A SYSTEM

(71) Applicant: International Business Machines Corporation, Armonk, NY (US)

(72) Inventors: Ariel Kass, Nofim (IL); Amalia Avraham, Petach Tikva (IL); Erez A. Theodorou, Petah Tikva (IL); Lior Tamary, Omer (IL)

(73) Assignee: International Business Machines Corporation, Armonk, NY (US)

( * ) Notice: Subject to any disclaimer, the term of this patent is extended or adjusted under 35 U.S.C. 154(b) by 280 days.

This patent is subject to a terminal disclaimer.

(21) Appl. No.: 16/732,611

(22) Filed: Jan. 2, 2020

(65) Prior Publication Data

US 2020/0133515 A1 Apr. 30, 2020

Related U.S. Application Data

(63) Continuation of application No. 15/961,729, filed on Apr. 24, 2018, now Pat. No. 10,564,863.

(51) Int. Cl.
*G06F 11/00* (2006.01)
*G06F 3/06* (2006.01)
(Continued)

(52) U.S. Cl.
CPC ............. *G06F 3/0617* (2013.01); *G06F 1/14* (2013.01); *G06F 3/067* (2013.01); *G06F 3/0685* (2013.01); *G06F 11/0757* (2013.01)

(58) Field of Classification Search
CPC ............. G06F 11/0757; G06F 11/0754; G06F 11/0751; G06F 11/076; G06F 11/1604;
(Continued)

(56) References Cited

U.S. PATENT DOCUMENTS 6,125,368 A * 9/2000 Bridge ................ G06F 11/1415
6,775,661 B1 8/2004 Redner
(Continued)

FOREIGN PATENT DOCUMENTS

WO 2011046551 A1 4/2011
WO 2016004120 A2 1/2016

OTHER PUBLICATIONS

Michael et al., "Providing Stable Storage for the Diskless Crash-Recovery Failure Model," University of Washington, Technical Report UW-CSE-Aug. 16, 2002, Aug. 25, 2016, 15 pages.
(Continued)

*Primary Examiner* — Katherine Lin
(74) *Attorney, Agent, or Firm* — Zilka-Kotab, P.C.

(57) ABSTRACT

A method according to one embodiment includes sending, from a first system to a second system, a request for a clock value associated with a third system; receiving, from the second system, a clock value associated with the third system and a query clock value determined at the second system; comparing, at the first system, the clock value associated with the third system to the query clock value determined at the second system; determining an amount of time since the third system contacted the second system, in response to determining that the query clock value is greater than the clock value associated with the third system; comparing the difference to a threshold time; determining that the third system is unavailable when the difference exceeds the predetermined threshold time value; and performing one or more predetermined actions at the first system in response to determining that the third system is unavailable.

20 Claims, 8 Drawing Sheets

(51) Int. Cl.
*G06F 1/14* (2006.01)
*G06F 11/07* (2006.01)

(58) Field of Classification Search
CPC .............. G06F 11/1608; G06F 11/1629; G06F 11/167; G06F 11/277
See application file for complete search history.

(56) References Cited

U.S. PATENT DOCUMENTS

| | | |
|---|---|---|
| 7,240,087 B1 | 7/2007 | Walker |
| 7,904,906 B2 | 3/2011 | Puthukattukaran et al. |
| 8,572,434 B2 | 10/2013 | Riegel et al. |
| 9,053,073 B1 | 6/2015 | Subramanian et al. |
| 9,274,710 B1 | 3/2016 | Oikarinen et al. |
| 9,280,296 B2 | 3/2016 | Crawford et al. |
| 9,395,922 B2 | 7/2016 | Nishikido et al. |
| 9,544,374 B2 | 1/2017 | Callaghan et al. |
| 10,564,863 B2 | 2/2020 | Kass et al. |
| 2005/0050112 A1 | 3/2005 | Chandrasekaran |
| 2008/0288646 A1* | 11/2008 | Hasha ................... H04L 67/104 709/228 |
| 2009/0172470 A1 | 7/2009 | Bobak et al. |
| 2011/0107135 A1 | 5/2011 | Andrews et al. |
| 2014/0013008 A1 | 1/2014 | Lazarus et al. |
| 2015/0156262 A1* | 6/2015 | Alves ...................... H04L 69/28 709/201 |
| 2015/0277802 A1 | 10/2015 | Oikarinen et al. |
| 2016/0378467 A1 | 12/2016 | Doshi |
| 2019/0324663 A1 | 10/2019 | Kass et al. |

OTHER PUBLICATIONS

Chen et al., "Quorum-Based Perfect Failure Detection Service," Microsoft Research Technical Report, MSR-TR-2009-62, May 2009, pp. 1-12.
Kerrisk, M., "Linux Programmer's Manual, Clock and Time Functions," Linux/UNIX system programming training, Feb. 2, 2018, pp. 1-6 retrieved from http://man7.org/linux/man-pages/man2/clock_getres.2.html.
Kass et al., U.S. Appl. No. 15/961,729, filed Apr. 24, 2018.
Non-Final Office Action from U.S. Appl. No. 15/961,729, dated Jun. 3, 2019.
Notice of Allowance from U.S. Appl. No. 15/961,729, dated Oct. 3, 2019.
List of IBM Patents or Patent Applications Treated as Related.

* cited by examiner

IDENTIFYING AN AVAILABILITY OF A SYSTEM

BACKGROUND

The present invention relates to data storage and recovery, and more specifically, this invention relates to identifying an availability or unavailability of a system in order to implement recovery procedures.

Redundant data storage is a valuable tool for maintaining data integrity and minimizing effects of storage failures. For example, data may be replicated between two or more separate systems, and when one system experiences operational issues, another system may help implement recovery operations. However, it is currently difficult to accurately and reliably determine an availability of each system within a redundant data storage environment due to inconsistent, non-synchronized clocks located at each system.

SUMMARY

A computer-implemented method according to one embodiment includes sending, from a first system to a second system, a request for a clock value associated with a third system; receiving, from the second system, a clock value associated with the third system and a query clock value determined at the second system; comparing, at the first system, the clock value associated with the third system to the query clock value determined at the second system; determining an amount of time since the third system contacted the second system, in response to determining that the query clock value is greater than the clock value associated with the third system, where the amount of time since the third system contacted the second system includes a difference between the clock value associated with the third system and the query clock value at the second system; comparing the difference to a predetermined threshold time value; determining that the third system is unavailable in response to determining that the difference exceeds the predetermined threshold time value; and performing one or more predetermined actions at the first system in response to determining that the third system is unavailable.

According to another embodiment, a computer program product for identifying an availability of a system includes a computer readable storage medium having program instructions embodied therewith, where the computer readable storage medium is not a transitory signal per se, and where the program instructions are executable by a processor to cause the processor to perform a method including sending, from a first system to a second system, a request for a clock value associated with a third system, utilizing the processor; receiving, from the second system, a clock value associated with the third system and a query clock value determined at the second system, utilizing the processor; comparing, utilizing the processor at the first system, the clock value associated with the third system to the query clock value determined at the second system; determining, utilizing the processor, an amount of time since the third system contacted the second system, in response to determining that the query clock value is greater than the clock value associated with the third system, where the amount of time since the third system contacted the second system includes a difference between the clock value associated with the third system and the query clock value at the second system; comparing the difference to a predetermined threshold time value, utilizing the processor; and determining, utilizing the processor, that the third system is unavailable in response to determining that the difference exceeds the predetermined threshold time value; and performing one or more predetermined actions at the first system in response to determining that the third system is unavailable, utilizing the processor.

A system according to another embodiment includes a processor; and logic integrated with the processor, executable by the processor, or integrated with and executable by the processor, where the logic is configured to send, from a first system to a second system, a request for a clock value associated with a third system; receive, from the second system, a clock value associated with the third system and a query clock value determined at the second system; compare, at the first system, the clock value associated with the third system to the query clock value determined at the second system; determine an amount of time since the third system contacted the second system, in response to determining that the query clock value is greater than the clock value associated with the third system, where the amount of time since the third system contacted the second system includes a difference between the clock value associated with the third system and the query clock value at the second system; compare the difference to a predetermined threshold time value; determine that the third system is unavailable in response to determining that the difference exceeds the predetermined threshold time value; and perform one or more predetermined actions at the first system in response to determining that the third system is unavailable.

Other aspects and embodiments of the present invention will become apparent from the following detailed description, which, when taken in conjunction with the drawings, illustrate by way of example the principles of the invention.

DETAILED DESCRIPTION

Figure 1:
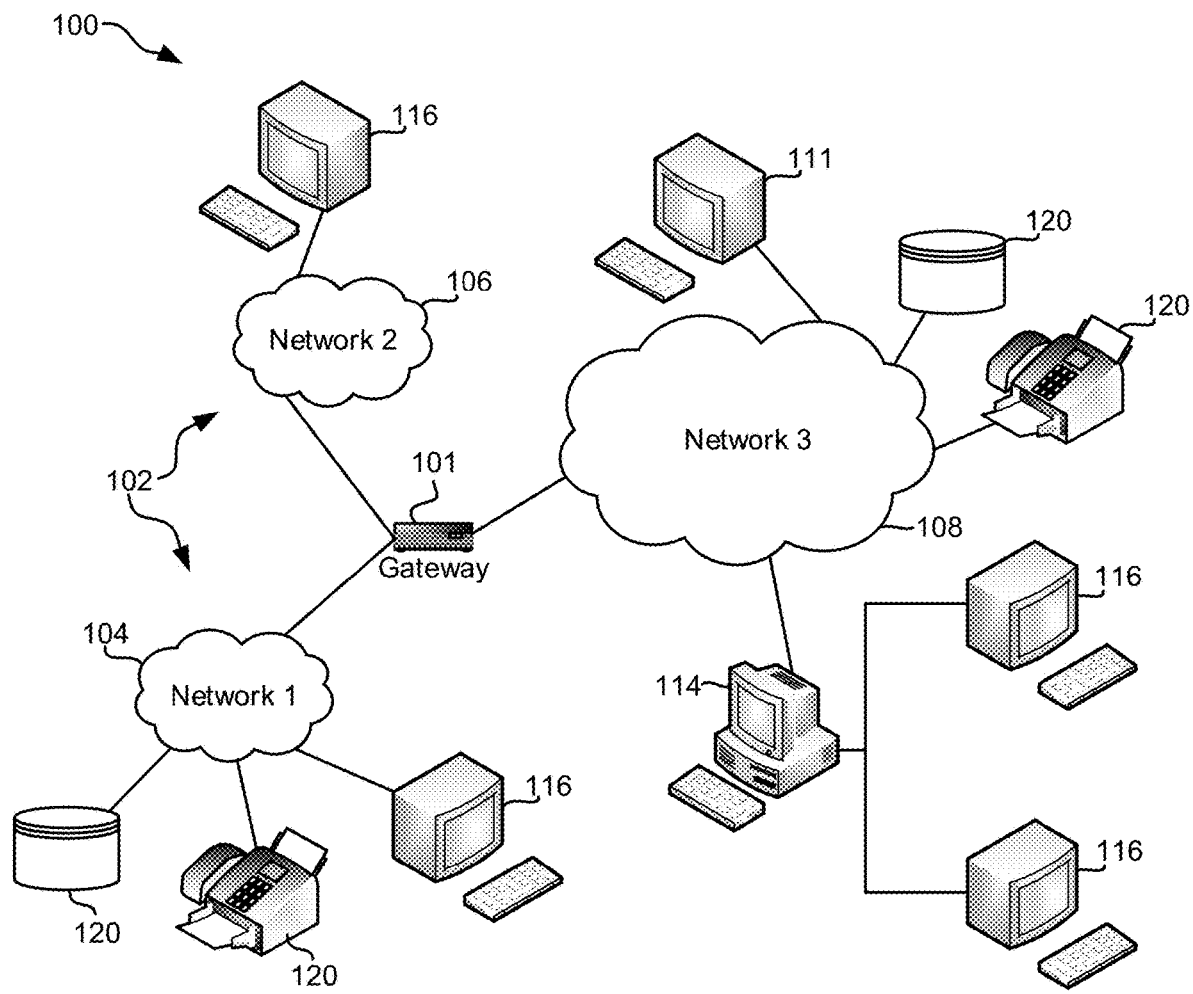
FIG. 1 illustrates a network architecture, in accordance with one embodiment.

The following description discloses several preferred embodiments of systems, methods and computer program products for identifying an availability of a system. Various embodiments provide a method to identify an availability of a first system via clock values associated with the first system that are retrieved from a second system, in addition to a query clock value retrieved from the second system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for identifying an availability of a system.

In one general embodiment, a computer-implemented method includes sending, from a first system to a second system, a request for a clock value associated with a third system, receiving, from the second system, a clock value associated with the third system and a query clock value determined at the second system, comparing, at the first system, the clock value associated with the third system to the query clock value determined at the second system to determine whether the third system is unavailable, and performing one or more predetermined actions at the first system in response to determining that the third system is unavailable.

In another general embodiment, a computer program product for identifying an availability of a system includes a computer readable storage medium having program instructions embodied therewith, where the computer readable storage medium is not a transitory signal per se, and where the program instructions are executable by a processor to cause the processor to perform a method comprising sending, from a first system to a second system, a request for a clock value associated with a third system, utilizing the processor, receiving, from the second system, a clock value associated with the third system and a query clock value determined at the second system, utilizing the processor, comparing, at the first system, the clock value associated with the third system to the query clock value determined at the second system to determine whether the third system is unavailable, utilizing the processor, and performing one or more predetermined actions at the first system in response to determining that the third system is unavailable, utilizing the processor.

In another general embodiment, a computer-implemented method includes receiving a message at a second system from a first system, identifying a clock value associated with the message, storing the clock value in association with an identifier of the first system, receiving a query at the second system from a third system different from the first system, and returning to the third system, by the second system, the clock value, the identifier of the first system, and a query clock value.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
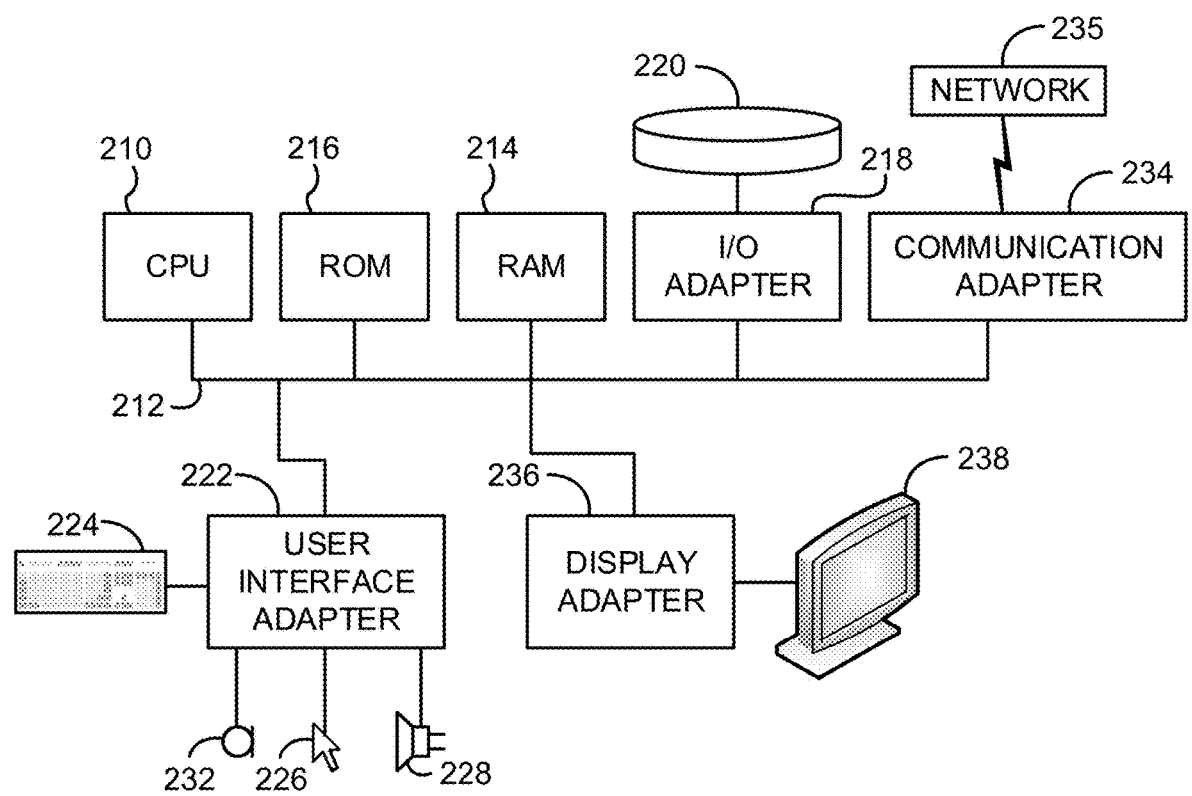
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235

(e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
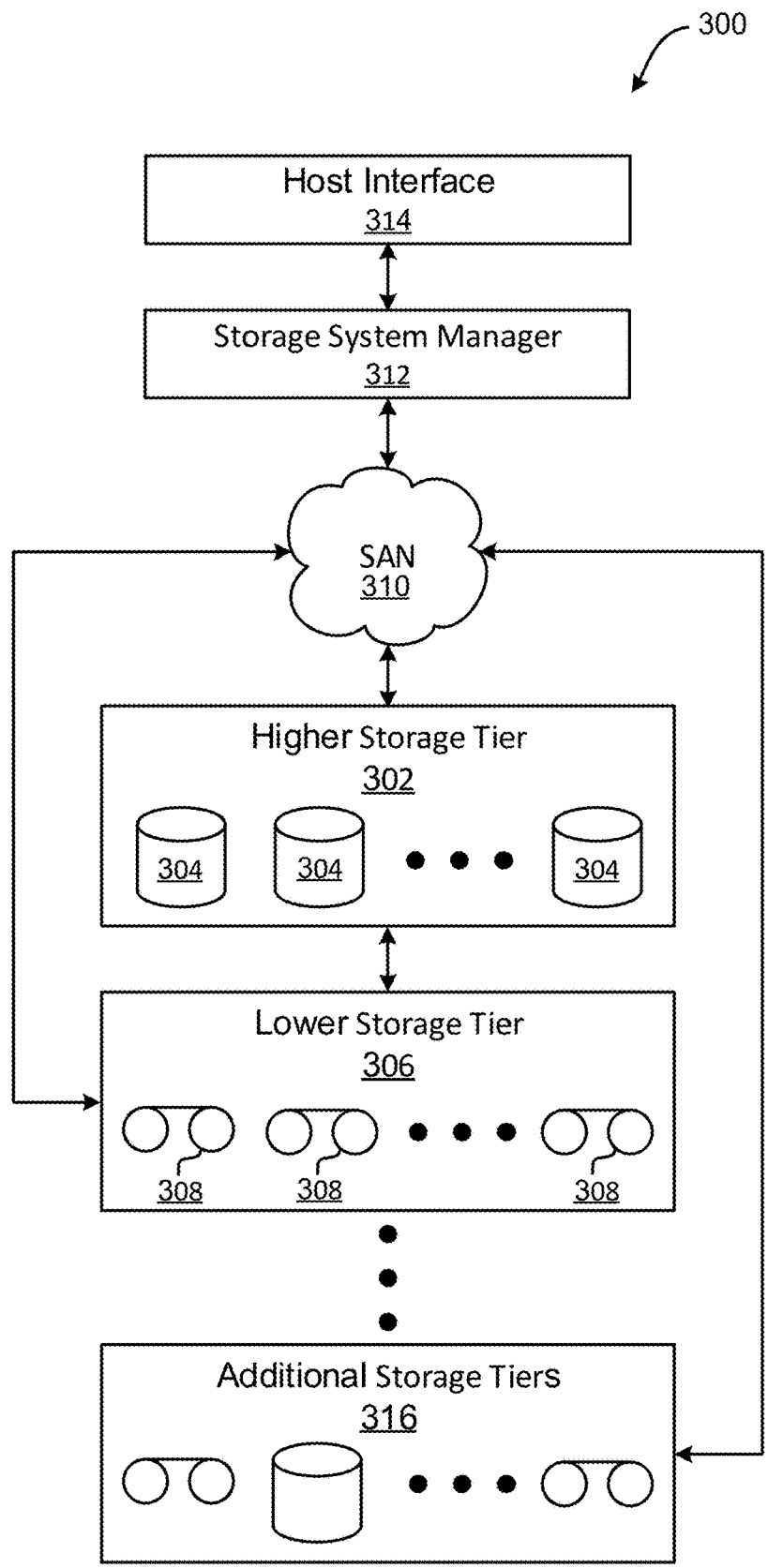
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
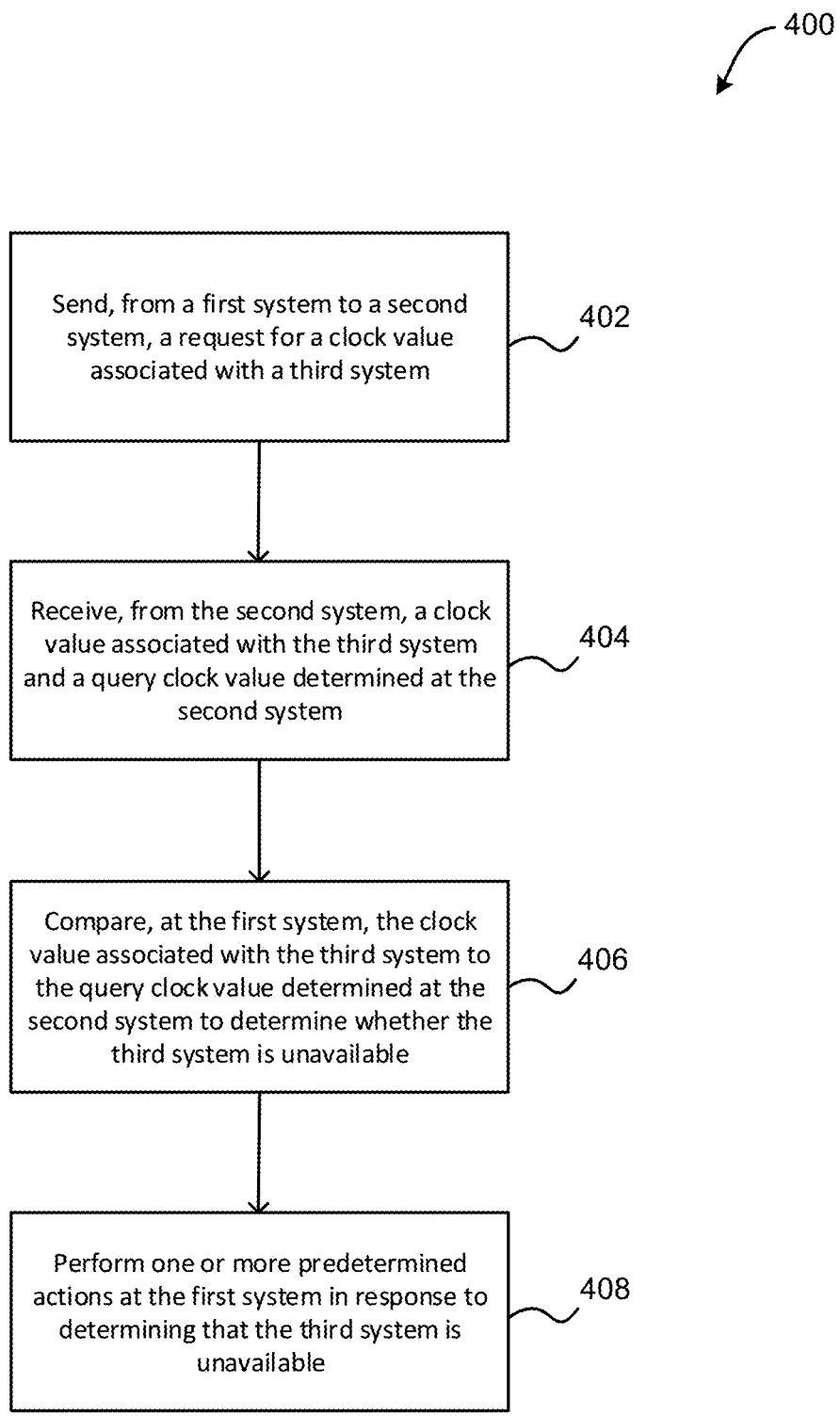
FIG. 4 illustrates a method for identifying an availability of a system, in accordance with one embodiment.

Now referring to FIG. 4, a flowchart of a method 400 is shown according to one embodiment. The method 400 may be performed in accordance with the present invention in any of the environments depicted in FIGS. 1-3 and 8, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a request for a clock value associated with a third system is sent from a first system to a second system. In one embodiment, the first system and the third system may each include a storage array. For example, each storage array may comprise a plurality of storage volumes for storing data. In another embodiment, the first system may contain a volume that is synchronously replicated with a volume that is stored on the third system (e.g., to create a synchronously replicated stretch volume, etc.). Of course, however, the first system and third system may each include any type of computerized system.

Additionally, in one embodiment, the second system may include a quorum witness. For example, the quorum witness may include a system that is in communication with, and maintains a status of, each of a plurality of other systems (e.g., at least the first system and the third system, etc.). In another embodiment, the request for the clock value may include a query. In yet another embodiment, the first system may send the query to the second system using a node (e.g., a quorum node, etc.) within the first system.

Further, in one embodiment, the first, second, and third systems may all be physically separate from each other. For example, each system may be implemented using different hardware from the other systems. In another example, each system may be located at a different physical location from the other systems.

Further still, in one embodiment, the request may include a query to the second system. In another embodiment, the clock value associated with the third system may include a clock value associated with a status notification last received by the second system by the third system. In yet another embodiment, the request may include a general request for clock values associated with all systems in communication with the second system.

Also, method 400 may proceed with operation 404, where a clock value associated with the third system and a query clock value determined at the second system is received from the second system. In one embodiment, the clock value associated with the third system and the query clock value determined at the second system may be received from the second system in response to the request.

In addition, in one embodiment, the query clock value may include a value for a clock at the second system when the request (e.g., for the clock value associated with the third system) was received from the first system at the second system. For example, the clock may include a monotonic clock. In another example, the monotonic clock may include a clock that starts at a random start point (e.g., in response to a start-up of the second system, etc.). In yet another example, the monotonic clock may be incremented monotonically (e.g., without variation, etc.) from the random start point. In this way, the monotonic clock may act as a timer that is unaffected by time changes (e.g., time changes made to a system clock of the second system, etc.).

Furthermore, in one embodiment, the clock value associated with the third system may include a value for the clock at the second system when the third system last contacted the second system. For example, third system may periodically contact the second system by sending a message to the second system (e.g., at a predetermined interval, etc.). In another example, the message may include a heartbeat message (e.g., a message sent from a first entity to a second entity that enables the second entity or another entity to identify if and when the first entity fails or is no longer available, etc.).

Further still, in one embodiment, the clock value associated with the third system and the query clock value may be adjusted to account for a random starting point of a monotonic clock of the second system. In another embodiment, the first system may receive values for the clock at the second system when each of a plurality of systems last contacted the second system. For example, all clock values returned by the second system may be adjusted by the second system prior to returning the clock values to account for a random starting point of a monotonic clock of the second system.

Also, method 400 may proceed with operation 406, where the clock value associated with the third system is compared at the first system to the query clock value determined at the second system to determine whether the third system is unavailable. In one embodiment, the comparison may result in determining that the query clock value is greater than the clock value associated with the third system.

Additionally, in one embodiment, an amount of time since the third system contacted the second system may be determined, in response to determining that the query clock value is greater than the clock value associated with the third system. For example, the amount of time since the third system contacted the second system may include a difference between the clock value associated with the third system and the query clock value at the second system.

Further, in one embodiment, the difference may be compared to a predetermined threshold time value (e.g., three seconds, etc.). In another embodiment, it may be determined that the third system is unavailable in response to determining that the difference exceeds the predetermined threshold time value. In yet another embodiment, it may be determined that the third system is available in response to determining that the difference does not exceed the predetermined threshold time value.

Further still, in one embodiment, the comparison may result in determining that the query clock value is less than the clock value associated with the third system. In another embodiment, the clock value associated with the third system may be compared to a predetermined reconnection grace time, in response to determining that the query clock value is less than the clock value associated with the third system.

Also, in one embodiment, it may be determined that the third system is unavailable in response to determining that the clock value associated with the third system is greater than a predetermined reconnection grace time. In another embodiment, no determination may be made about the third system in response to determining that the clock value associated with the third system is less than the predetermined reconnection grace time. In yet another embodiment, the reconnection grace time may include a predetermined time value (e.g., ten seconds, etc.) associated with a time for the second system to restart and reset its clock.

In addition, method 400 may proceed with operation 408, where one or more predetermined actions are performed at the first system in response to determining that the third system is unavailable. In one embodiment, the one or more predetermined actions may include one or more fail-over operations, one or more fail-back operations, one or more recovery operations, etc.

For example, the first system may include a volume that is synchronously replicated on the third system (e.g., to create a synchronously replicated stretch volume, etc.). In another embodiment, the synchronously replicated volume may be provided to one or more hosts, and one or more applications running on the one or more hosts. In yet another embodiment, before becoming unavailable, the third system may provide all or a portion of requested data from the synchronously replicated volume to the one or more hosts and the one or more applications running on the one or more hosts.

In another example, in response to determining that the third system is unavailable, the first system may provide all requested data from the synchronously replicated volume to the one or more hosts and the one or more applications running on the one or more hosts (e.g., instead of the third system, etc.). In yet another example, the first system may also be used to restore the synchronously replicated volume at the third system, in response to determining that the third system is unavailable.

Furthermore, in one embodiment, the third system may be labeled as unavailable in response to determining that the third system is unavailable. In another embodiment, one or more notifications may be sent (e.g., to one or more users, administrators, etc.) in response to determining that the third system is unavailable.

In this way, accurate system availability may be determined between systems without the need to synchronize inconsistent clocks within the systems. For example, clock values for the first system and the second system need not be stored in persistent memory in order to determine system availability. This may reduce an amount of data that needs to be stored in order to determine system availability, and may also reduce an amount of processing that needs to be performed in order to determine system availability (e.g., since only a comparison between the clock value associated with the third system and the query clock value determined at the second system is necessary to determine an availability of the third system).

Figure 5:
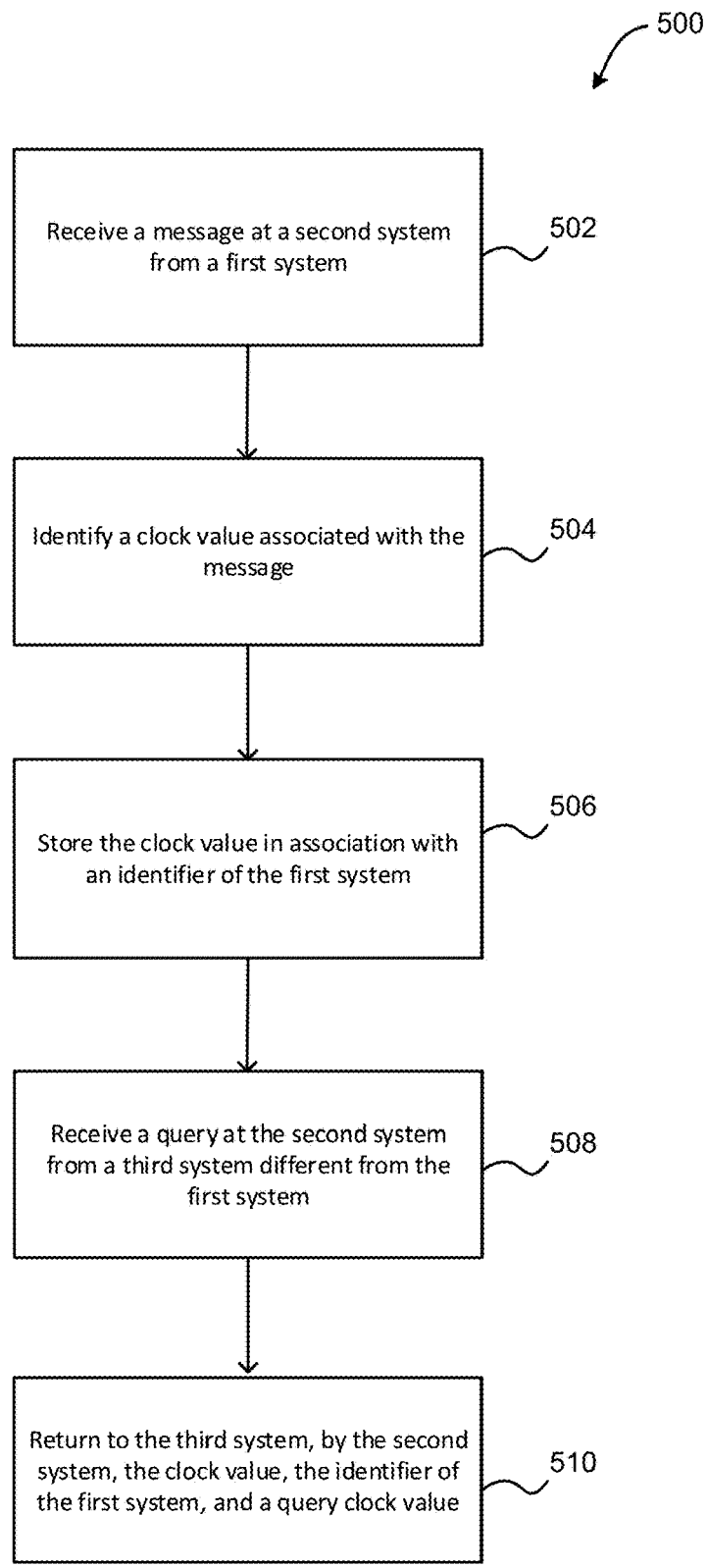
FIG. 5 illustrates a method for managing a quorum witness system, in accordance with one embodiment.

Now referring to FIG. 5, a flowchart of a method 500 for managing a quorum witness system is shown according to one embodiment. The method 500 may be performed in accordance with the present invention in any of the environments depicted in FIGS. 1-3 and 8, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a message is received at a second system from a first system. In one embodiment, the first system may include a storage array. In another embodiment, the second system may include a quorum witness. In yet another embodiment, the message may include a status notification (e.g., a "heartbeat" notification, etc.).

Additionally, method 500 may proceed with operation 504, where a clock value associated with the message is identified. In one embodiment, the clock value may include a time value indicated by a clock at the second system. In another embodiment, the clock value may include a time indicated by the clock at the second system when the message was received at the second system from the first system. In yet another embodiment, the clock may include a monotonic clock. For example, the clock value may be adjusted by the second system to account for a random starting point of a monotonic clock of the second system.

Further, method 500 may proceed with operation 506, where the clock value is stored in association with an identifier of the first system. For example, the clock value may be stored at the second system (e.g., as a timestamp). In another example, the clock value may be stored in a database of timestamps of the second system. In yet another example, the clock value may be stored in association with an identifier of the first system.

Further still, in one embodiment, the clock value may overwrite an earlier stored clock value in association with the identifier of the first system. For example, the clock value may be stored as a last received status notification from the first system.

Also, method 500 may proceed with operation 508, where a query is received at the second system from a third system different from the first system. In one embodiment, the third system may also include a storage array. In another embodiment, the third system may have a storage volume that is replicated (e.g., synchronously) on the first system. In yet another embodiment, the query may include a query for a clock value associated with all systems other than the third system that are in communication with the second system. In still another embodiment, the query may include a query for a clock value associated with a specific system.

In addition, method 500 may proceed with operation 510, where the clock value, the identifier of the first system, and a query clock value are returned to the third system by the second system. In one embodiment, the query clock value may include a value for a clock at the second system when the request was received from the third system at the second system. In another embodiment, the query clock value may be returned with an associated identifier (e.g., identifying the query clock value as the time the query was received, etc.). In yet another embodiment, query clock values for all systems in communication with the second system may be returned. For example, each clock value may have an associated identifier indicating the specific system having that clock value.

Figure 6:
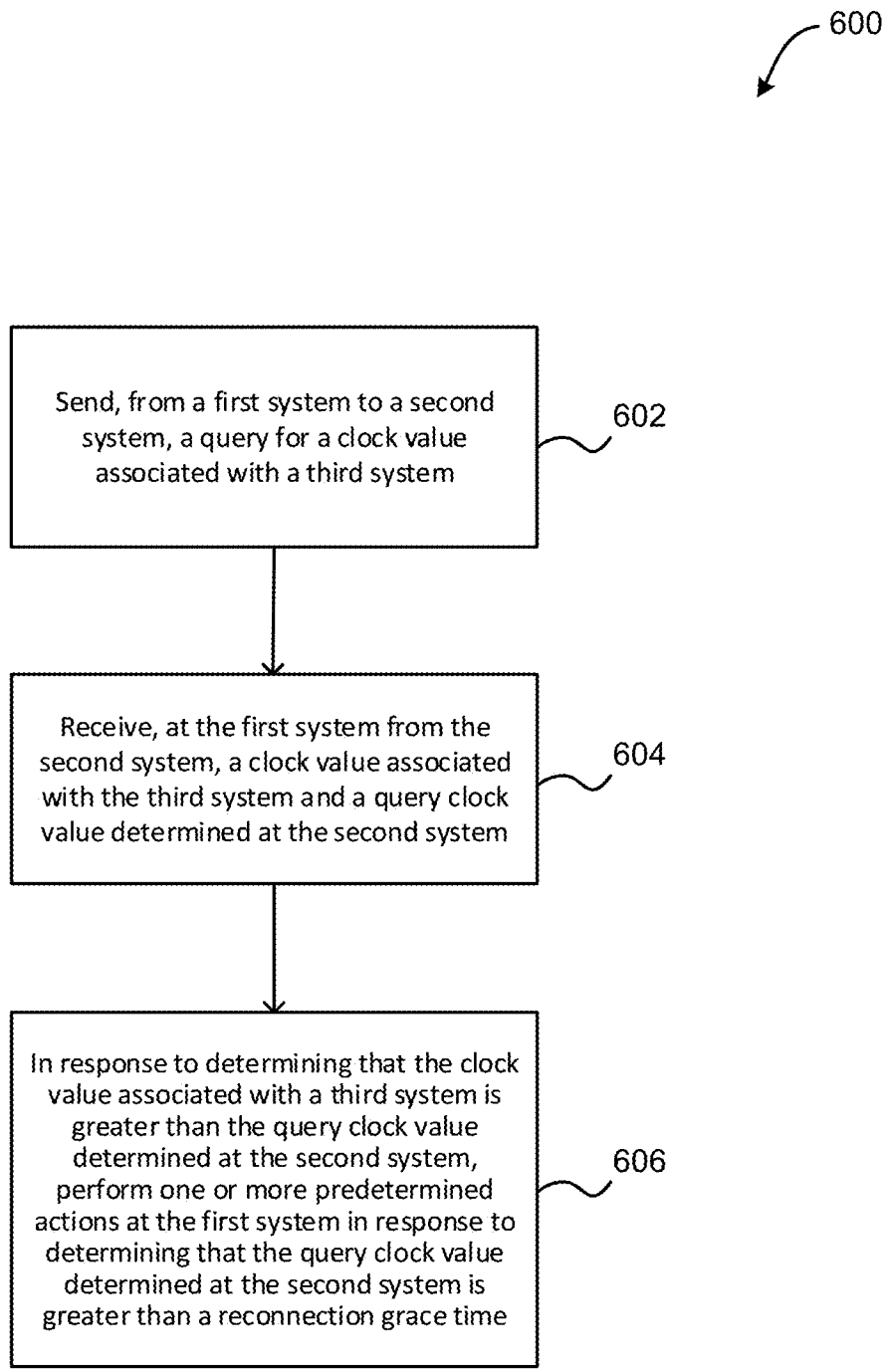
FIG. 6 illustrates a method for implementing a quorum witness reconnection grace time, in accordance with one embodiment.

Now referring to FIG. 6, a flowchart of a method 600 for implementing a quorum witness reconnection grace time is shown according to one embodiment. The method 600 may be performed in accordance with the present invention in any of the environments depicted in FIGS. 1-3 and 8, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a query for a clock value associated with a third system is sent from a first system to a second system. In one embodiment, the first and third systems may each include a distinct storage array. In another embodiment, the second system may include a quorum witness.

Additionally, method 600 may proceed with operation 604, where a clock value associated with the third system and a query clock value determined at the second system are received at the first system from the second system. In one embodiment, the clock value associated with the third system may include a time indicated by the clock at the second system when a status notification message was received at the second system from the third system.

Further, method 600 may proceed with operation 606, where in response to determining that the clock value associated with a third system is greater than the query clock value determined at the second system, one or more predetermined actions are performed at the first system in response to determining that the query clock value determined at the second system is greater than a reconnection grace time.

Further still, in one embodiment, the one or more predetermined actions may include one or more fail-over operations. In another embodiment, the one or more predetermined actions may include labelling the third system as unavailable. In yet another embodiment, the reconnection grace time may include a predetermined time value (e.g., ten seconds, etc.) associated with a time for the second system to restart and reset its clock.

Figure 7:
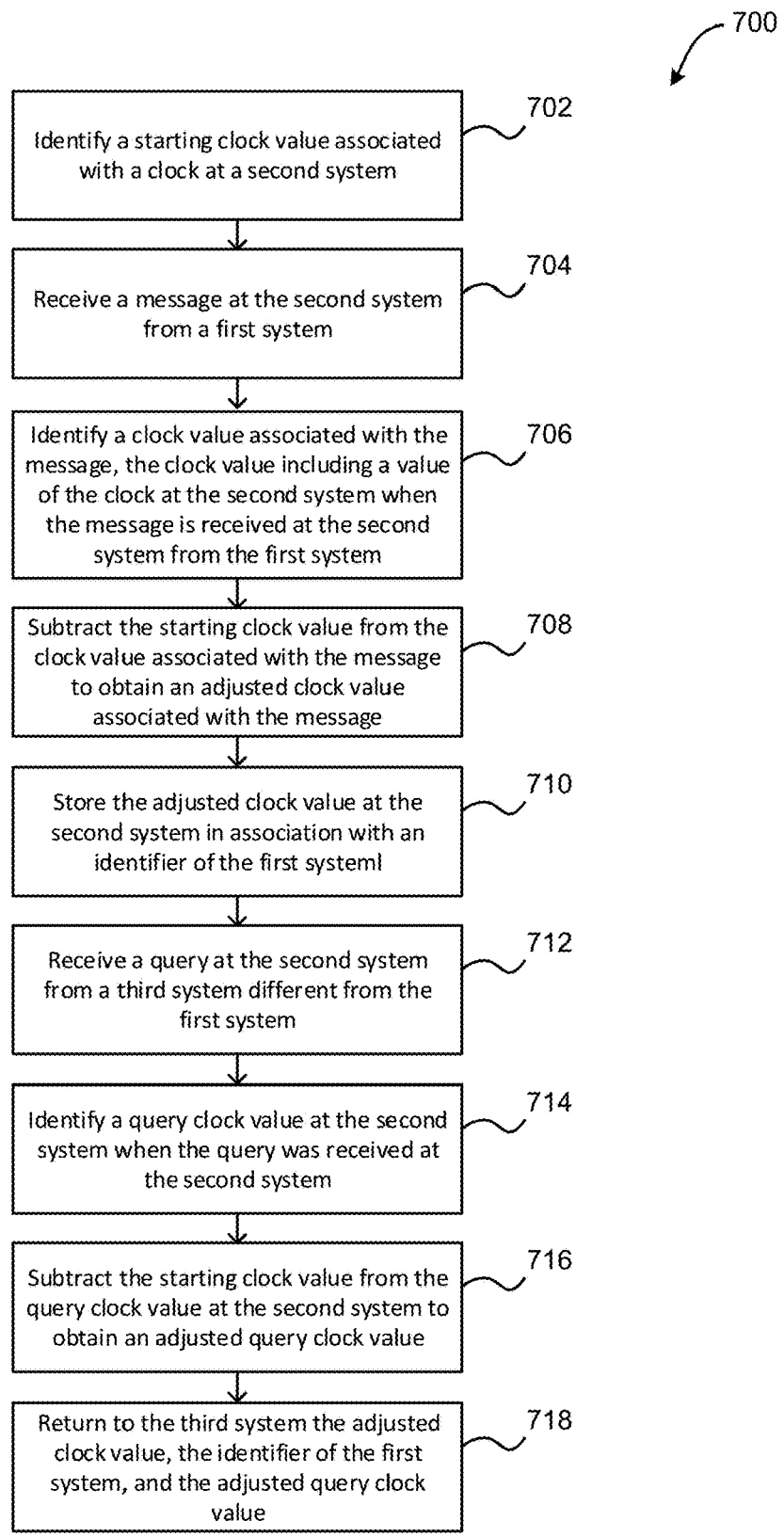
FIG. 7 illustrates a method for adjusting monotonic clock values at a quorum witness, in accordance with one embodiment.

Now referring to FIG. 7, a flowchart of a method 700 for adjusting monotonic clock values at a quorum witness is shown according to one embodiment. The method 700 may be performed in accordance with the present invention in any of the environments depicted in FIGS. 1-3 and 8, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a starting clock value associated with a clock is identified at a second system. In one embodiment, the starting clock value may be identified in response to a loading of the second system. In another embodiment, the second system may include a quorum witness. In yet another embodiment, the clock may include a monotonic clock.

Additionally, method 700 may proceed with operation 704, where a message from a first system is received at the second system. In one embodiment, the first system may include a storage array. In another embodiment, the message may include a status notification.

Further, method 700 may proceed with operation 706, where a clock value associated with the message is identified, where the clock value includes a value of the clock at the second system when the message is received at the second system from the first system. Further still, method 700 may proceed with operation 708, where the starting clock value is subtracted from the clock value associated with the message to obtain an adjusted clock value associated with the message. This may adjust the clock value associated with the message to account for a random starting point of a monotonic clock of the second system.

Further still, method 700 may proceed with operation 710, where the adjusted clock value is stored at the second system in association with an identifier of the first system. Also, method 700 may proceed with operation 712, where a query is received at the second system from a third system different from the first system. In one embodiment, the third system may include a storage array. In another embodiment, the first system may contain a volume that is synchronously replicated with a volume that is contained within the third system (e.g., to create a synchronously replicated stretch volume, etc.).

In addition, method 700 may proceed with operation 714, where a query clock value is identified at the second system when the query was received at the second system. For example, may a value of a monotonic clock at the second system may be identified by the second system.

Furthermore, method 700 may proceed with operation 716, where the starting clock value is subtracted from the query clock value at the second system to obtain an adjusted query clock value. Further still, method 700 may proceed with operation 718, where the adjusted clock value, the identifier of the first system, and the adjusted query clock value are returned to the third system.

In this way, all time stamps returned by the quorum witness may be adjusted to account for a random starting point of a monotonic clock of the quorum witness, such that all adjusted time stamps start at a time t=0.

Figure 8:
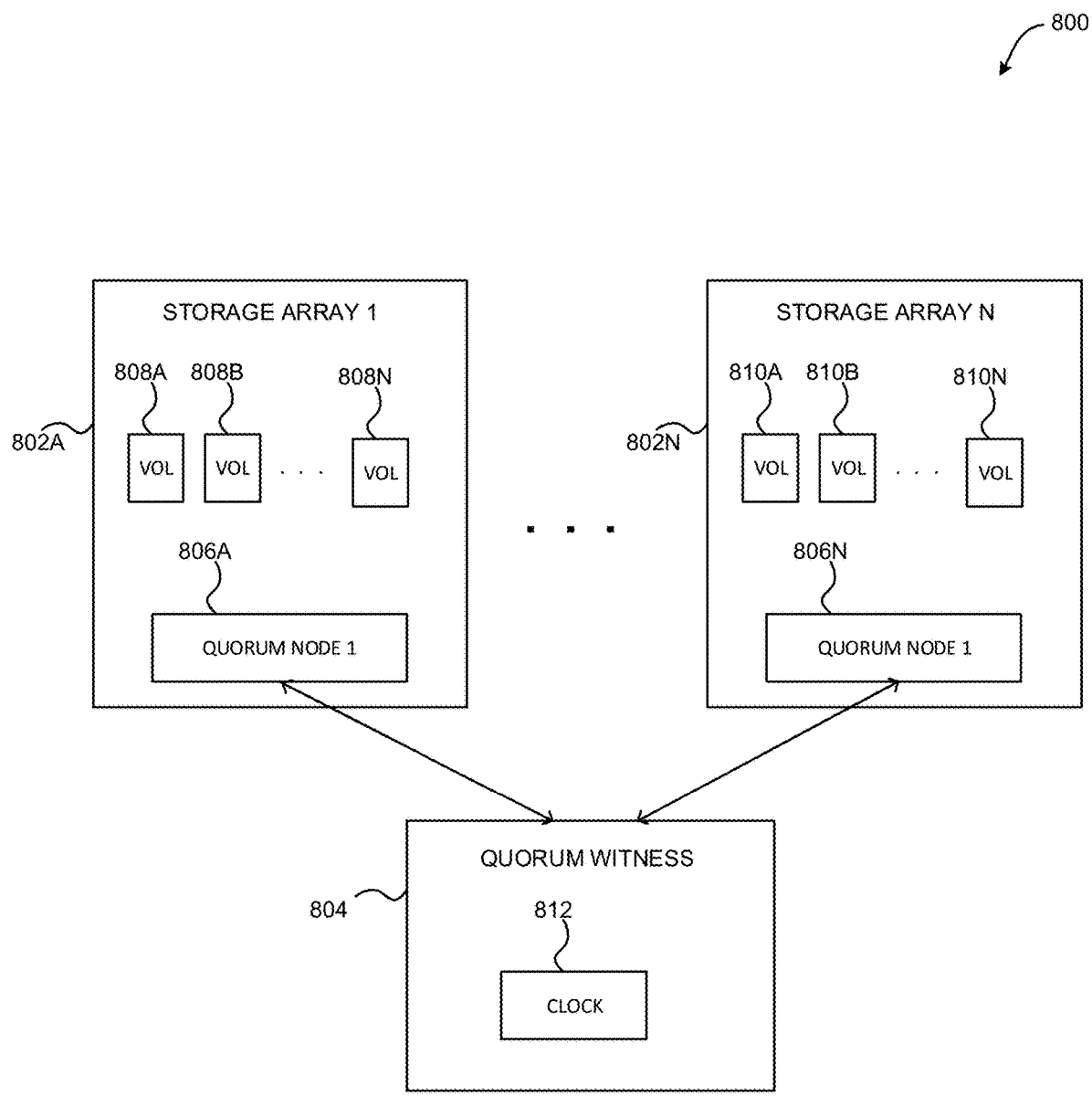
FIG. 8 illustrates an exemplary synchronous replication environment implementing peer availability monitoring, in accordance with one embodiment.

FIG. 8 illustrates a synchronous replication environment 800 implementing peer availability monitoring, according to one embodiment. As shown in FIG. 8, the environment 800 includes a plurality of storage arrays 802A-N that are each in communication with a quorum witness 804 via respective quorum nodes 806A-N within each of the storage arrays 802A-N.

Additionally, each of the storage arrays 802A-N includes a plurality of storage volumes 808A-N and 810A-N, respectively. In one embodiment, one of the storage volumes 808A-N within the first storage array 802A may be synchronously replicated as another one of the storage volumes 810A-N of the Nth storage array 802N. For example, a first storage volume 808A and a second storage volume 810A may be replicated synchronously to create a stretch volume. In another embodiment, each of the storage arrays 802A-N may include separate hardware, may be located at a different location from the other storage arrays, etc.

Further, in one embodiment, each of the storage arrays 802A-N may periodically send a status notification message to the quorum witness 804. For example, each of the storage arrays 802A-N may send a status notification message to the quorum witness 804 at a predetermined time interval. Upon receiving a status notification message (e.g., a "heartbeat" message, etc.) from one of the storage arrays 802A-N, the quorum witness 804 may identify a clock value indicated by a monotonic clock 812 of the quorum witness 804, and may record the clock value in association with the one of the storage arrays 802A-N that sent the status notification message (e.g., in a database of the quorum witness 804, etc.).

In another embodiment, the recorded time may overwrite a previously recorded time for the one of the storage arrays 802A-N. In yet another embodiment, the quorum witness 804 may adjust the recorded time to account for a random starting point of the monotonic clock 812 of the quorum witness 804. In this way, the quorum witness 804 may store clock values indicating a monotonic clock time at which the quorum witness most recently received status notification messages from each of the storage arrays 802A-N.

Further still, in one embodiment, one of the storage arrays 802A-N may send a query (e.g., utilizing their respective quorum node 806A-N, etc.) to the quorum witness 804. For example, the query may include a request for clock values at which the quorum witness most recently received status notification messages from each of the storage arrays 802A-N. In response to the query, the quorum witness 804 may first identify a query clock value indicated by the monotonic clock 812 of the quorum witness 804 at which the query was received.

The quorum witness may then send to the requesting one of the storage arrays 802A-N the query clock value, as well as clock values at which the quorum witness most recently received status notification messages from each of the storage arrays 802A-N. Upon receiving such information, the requesting one of the storage arrays 802A-N may determine which of the storage arrays 802A-N are unavailable, and may perform one or more associated fail-over or fail-back actions.

Identifying an Unhealthy System According to Timestamp and Monotime

One goal of a transparent failover/hyperswap feature may include supporting a high availability or recovery time objective (RTO) of zero. After an event that destroys production storage, the time to recover and make applications operational is zero. For example, the application should experience no down time as a result of a storage failure.

A stretch cluster is a high availability (HA) solution that may enable hosts to access a stretch volume, which may be made of a set of two volumes replicated synchronously that reside on two separate storage arrays. The stretch volume may appear as a single volume to the hosts and may make transitions such as fail-over and fail-back completely transparent to the hosts and the applications running on the hosts.

Table 1 illustrates exemplary components of an HA solution, in accordance with one embodiment. Of course, it should be noted that the exemplary components shown in Table 1 are set forth for illustrative purposes only, and thus should not be construed as limiting in any manner.

TABLE 1

| COMPONENT | DESCRIPTION |
| --- | --- |
| Stretch volume | The volumes' contents are identical by synchronous replication<br>SCSI behavior consistent with a single volume exposed through separate paths:<br>The volumes have the same SCSI identity through Volume masquerading<br>The volumes are consistent with regards to SCSI reservations |
| Active-preferred/active-non-preferred access | Asymmetric Logical Unit Access (ALUA) allows paths to a SCSI device to be marked as having distinct characteristics. ALUA will be used to export the stretch volume from both storage arrays simultaneously, the paths to the storage array holding the Master volume will be marked as active/preferred and the paths to the Slave side volume will be marked as active/non-preferred |
| HA Logic | HA Logic: Logic which identifies Master failure and triggers automatic fail-over<br>A Quorum Witness (QW) at a third location with connectivity to both systems will be used as a tie breaker |

TABLE 1-continued

| COMPONENT | DESCRIPTION |
| --- | --- |
| | A Quorum node (QN) on each storage array communicates with the QW |

To fulfill the transparent failover/hyperswap feature, there are many actors that may need to be in sync—the QW and each storage array connection, via a QN, to the QW. All these actors may coordinate fail-overs, based on a peer storage array going down, and they may do so as fast as possible without false-positives.

The time since the last communication between the remote peer and the QW is used to determine a need for fail-overs. This may be used together with local peer knowledge to determine whether the remote peer is available or not. Solely relying on the local peer knowledge may be avoided, as direct communication between the storage arrays may be severed and any local peer knowledge may be outdated.

Each one of the actors has an independent clock, which itself may be moved by user intervention or automatically based on Network Time Protocol (NTP) updates (e.g. by moving to daylight savings, etc.). As a result, there is a need for all the actors to properly detect and communicate peer availability, even though their clocks are not consistent and are not synchronized.

In one embodiment, all the actors may report changes by utilizing only the monotonic clock of the QW, with QW restart grace time considerations. Each request by any storage array may not contain any clock information, and responses from the QW may contain the QW's monotonic clock's value at the time of request processing. These values may be the only values used as reference in any determinations of peer availability by the storage arrays.

This solution may rely solely on the monotonic clock of the QW. This clock may not be affected by NTP updates and may not be able to be changed via user intervention. The monotonic clock may receive an initial value upon system power-up and may consistently increase its value. Each storage array may register on the QW and the QW may create a record of the storage array for monitoring its latest "I'm still alive" announcement, or heartbeat (HB).

After the storage arrays register, they send HBs during a predetermined interval (e.g., every 1 second, etc.) to the QW. These HBs may be processed by the QW and the latter may store the monotonic clock value at the time of processing, or time-stamp, translated to milliseconds, as the last HB time of the storage array.

When other storage arrays query for peer storage array HB times, the QW may add the current monotonic clock value at the time of the query processing, or query time, to the query response.

Table 2 illustrates an exemplary query response from the QW, in accordance with one embodiment. Of course, it should be noted that the exemplary query response shown in Table 2 is set forth for illustrative purposes only, and thus should not be construed as limiting in any manner.

TABLE 2

```
{
  "query_time" : 216515132,
  "systems" : [
    { "storage_array_id" : "storage_array_1", "HB_time" : 142240924
    },
    { "storage_array_id" : "storage_array_2", "HB_time" : 216515059
    },
    { "storage_array_id" : "storage_array_3", "HB_time" : 216515129
```

TABLE 2-continued

```
        },
                { "storage_array_id" : "storage_array_4", "HB_time" : 216515118
        },
                { "storage_array_id" : "storage_array_5", "HB_time" : 322515117
        },
                { "storage_array_id" : "storage_array_6", "HB_time" : 215891880
        },
                { "storage_array_id" : "storage_array_7", "HB_time" : 6386 },
                { "storage_array_id" : "storage_array_8", "HB_time" : 6386 },
                { "storage_array_id" : "storage_array_9", "HB_time" : 216514992
        }
    ]
}
```

The querying storage array may now compare each storage array's HB time with the query time, as they are both values from the same clock. For example, if the peer storage array's HB time is smaller than the query time by more than a predetermined time (e.g., 3 seconds, etc.), then the peer storage array has stopped communicating with the QW and is considered unavailable. In the sample response in Table 2, storage arrays 1, 6, 7 and 8 may all be considered unavailable, as 3 seconds is 3000 milliseconds and each of these storage arrays' HB time value is smaller than the query time value by more than 3,000 milliseconds.

In another embodiment, if the peer storage array's HB time is not smaller than the query time by more than the predetermined time (e.g., the peer storage array's HB time is smaller than the query time but by less than 3 seconds, etc.) then the system may be considered available. In the sample response in Table 2, storage arrays 2, 3, 4 and 9 may all be considered available, as each of these storage arrays' HB time value is smaller than the query time value by less than 3,000 milliseconds.

Additionally, in one embodiment, if the machine running the QW is restarted, the monotonic clock may be reset. In such a case, the storage arrays' HB times may possibly be greater than the query time. For this we introduce a reconnection grace time. For example, if the peer storage array's HB time is smaller than the query time, the peer storage array's HB time may be checked as mentioned above. However, if the peer storage array's HB time is greater than the query time, the query time may be examined.

For example, if the query time is smaller than the reconnection grace time, then no conclusion may be made about the peer storage array's state. In another example, if the query time is greater than the reconnection grace time, the peer storage array may be considered unavailable, as it should have reconnected within the reconnection grace time.

A predetermined grace time (e.g., 10 seconds, etc.) may be set, since it takes some time for the QW to restart all of its components, and a few seconds may pass between setting the initial QW time-stamp from the monotonic clock value and until the first connection from a storage system can be processed. In the sample response in Table 2, storage array 5 may be considered unavailable, as the storage array's HB time is greater than the query time and the query time is greater than the reconnection grace time of 10 seconds, i.e. 10,000 milliseconds.

In one embodiment, a monotonic clock cannot be set and represents monotonic time since a random (e.g., unspecified, etc.) starting point. In view of this, it may be confirmed that all time-stamps used by the QW, as taken from the monotonic clock, start from zero. Otherwise, there may be no way of determining when the grace time has passed.

In order to accomplish this, when the QW loads, it may take the monotonic clock time at some moment (e.g., as a "QW start timestamp," etc.). From that moment, all values based on the monotonic clock may have the QW start timestamp value subtracted from them. For instance, this value may be subtracted from all storage array HB times and from all query times.

Table 3 illustrates an exemplary summary depicting what each storage array concludes about peer storage arrays' availability, based on the QW query response, in accordance with one embodiment. Of course, it should be noted that the exemplary summary shown in Table 3 is set forth for illustrative purposes only, and thus should not be construed as limiting in any manner.

TABLE 3

| Query response | Query time before reconnection grace period | Query time after reconnection grace period |
| --- | --- | --- |
| Peer storage array HB time > Query time | N/A | Unavailable |
| Peer storage array HB time < Query time − threshold time value | Unavailable | Unavailable |
| Query time − threshold time value ≤ Peer storage array HB time ≤ Query time | Available | Available |

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
sending, from a first system to a second system, a request for a clock value associated with a third system;
receiving, from the second system, a clock value associated with the third system and a query clock value determined at the second system;
comparing, at the first system, the clock value associated with the third system to the query clock value determined at the second system;
determining an amount of time since the third system contacted the second system, in response to determining that the query clock value is greater than the clock value associated with the third system, where the amount of time since the third system contacted the second system includes a difference between the clock value associated with the third system and the query clock value at the second system;
comparing the difference to a predetermined threshold time value;
determining that the third system is unavailable in response to determining that the difference exceeds the predetermined threshold time value; and
performing one or more predetermined actions at the first system in response to determining that the third system is unavailable.

2. The computer-implemented method of claim 1, wherein the first system and the third system each include a storage array.

3. The computer-implemented method of claim 1, wherein the second system includes a quorum witness that is in communication with, and maintains a status of, at least the first system and the third system.

4. The computer-implemented method of claim 1, wherein the first system sends the request to the second system using a quorum node within the first system.

5. The computer-implemented method of claim 1, wherein the request includes a general request for clock values associated with all systems in communication with the second system.

6. The computer-implemented method of claim 1, wherein the query clock value includes a value for a clock at the second system when the request for the clock value associated with the third system was received from the first system at the second system.

7. The computer-implemented method of claim 1, wherein a clock at the second system includes a monotonic clock.

8. The computer-implemented method of claim 1, wherein the clock value associated with the third system includes a value for a clock at the second system when the third system last contacted the second system.

9. The computer-implemented method of claim 1, wherein the clock value associated with the third system and the query clock value are adjusted to account for a random starting point of a monotonic clock of the second system.

10. The computer-implemented method of claim 1, further comprising:
comparing the clock value associated with the third system to a predetermined reconnection grace time, in response to determining that the query clock value is less than the clock value associated with the third system; and
determining that the third system is unavailable in response to determining that the clock value associated with the third system is greater than the predetermined reconnection grace time.

11. The computer-implemented method of claim 1, wherein the one or more predetermined actions include one or more fail-over operations.

12. A computer program product for identifying an availability of a system, the computer program product comprising a computer readable storage medium having program instructions embodied therewith, wherein the computer readable storage medium is not a transitory signal per se, the program instructions executable by a processor to cause the processor to perform a method comprising:
sending, from a first system to a second system, a request for a clock value associated with a third system, utilizing the processor;
receiving, from the second system, a clock value associated with the third system and a query clock value determined at the second system, utilizing the processor;
comparing, utilizing the processor at the first system, the clock value associated with the third system to the query clock value determined at the second system;
determining, utilizing the processor, an amount of time since the third system contacted the second system, in response to determining that the query clock value is greater than the clock value associated with the third system, where the amount of time since the third system contacted the second system includes a difference between the clock value associated with the third system and the query clock value at the second system;
comparing the difference to a predetermined threshold time value, utilizing the processor; and
determining, utilizing the processor, that the third system is unavailable in response to determining that the difference exceeds the predetermined threshold time value; and
performing one or more predetermined actions at the first system in response to determining that the third system is unavailable, utilizing the processor.

13. The computer program product of claim 12, wherein the first system and the third system each include a storage array.

14. The computer program product of claim 12, wherein the second system includes a quorum witness that is in communication with, and maintains a status of, at least the first system and the third system.

15. The computer program product of claim 12, wherein the first system sends the request to the second system using a quorum node within the first system.

16. The computer program product of claim 12, wherein the request includes a general request for clock values associated with all systems in communication with the second system.

17. The computer program product of claim 12, wherein the query clock value includes a value for a clock at the second system when the request for the clock value associated with the third system was received from the first system at the second system.

18. The computer program product of claim 12, wherein a clock at the second system includes a monotonic clock.

19. The computer program product of claim 12, wherein the clock value associated with the third system includes a value for a clock at the second system when the third system last contacted the second system.

20. A system, comprising:

a processor; and logic integrated with the processor, executable by the processor, or integrated with and executable by the processor, the logic being configured to:

send, from a first system to a second system, a request for a clock value associated with a third system;

receive, from the second system, a clock value associated with the third system and a query clock value determined at the second system;

compare, at the first system, the clock value associated with the third system to the query clock value determined at the second system;

determine an amount of time since the third system contacted the second system, in response to determining that the query clock value is greater than the clock value associated with the third system, where the amount of time since the third system contacted the second system includes a difference between the clock value associated with the third system and the query clock value at the second system;

compare the difference to a predetermined threshold time value;

determine that the third system is unavailable in response to determining that the difference exceeds the predetermined threshold time value; and perform one or more predetermined actions at the first system in response to determining that the third system is unavailable.

* * * * *